United States Patent [19]

Hoon et al.

[11] 3,955,947

[45] May 11, 1976

[54] BAG FILTER CLEANING DEVICE

[75] Inventors: Harry E. Hoon, Elgin, Ill.; Marion C. Pogoda, Lebanon, Pa.

[73] Assignee: Envirotech Corporation, Menlo Park, Calif.

[22] Filed: Nov. 13, 1974

[21] Appl. No.: 523,290

[52] U.S. Cl. ............................... 55/300; 55/304; 210/388
[51] Int. Cl.² ........................................ B01D 41/04
[58] Field of Search ............ 55/112, 300, 301, 304, 55/305, 291, 341; 29/81 R; 210/388

[56] References Cited
UNITED STATES PATENTS

| 2,702,090 | 2/1955 | Brown et al. | 55/300 X |
| 2,805,731 | 9/1957 | Kron | 55/300 X |
| 3,606,733 | 9/1971 | Arstikaitis | 55/300 X |

FOREIGN PATENTS OR APPLICATIONS

| 532,878 | 8/1931 | Germany | 55/300 |
| 167,989 | 8/1959 | Sweden | 55/291 |
| 821,752 | 10/1959 | United Kingdom | 55/300 |
| 997,646 | 1/1952 | France | 55/300 |

*Primary Examiner*—Frank W. Lutter
*Assistant Examiner*—David L. Lacey
*Attorney, Agent, or Firm*—Robert E. Krebs; Thomas S. MacDonald

[57] ABSTRACT

Impacting devices are provided to strike the sway frame which supports the filtering bags in a bag house. The impacting devices each include a stationarily-mounted bracket, an externally-threaded sleeve that is adjustably received in the bracket, a bolt-like striker member slidable in the sleeve and a coil spring which biases the striker member to an extended position relative to the sleeve.

21 Claims, 2 Drawing Figures

BAG FILTER CLEANING DEVICE

BACKGROUND OF THE INVENTION

1. Field of the Invention

The present invention generally relates to dust collecting devices of the type using bag-like cloth or fabric filtering elements and, more particularly, to a means for cleaning the filtering elements in such devices to discharge accumulated particulates.

2. State of the Art

It is well-known to accomplish large-scale cleaning of suspended particles from gaseous streams by passing the streams through a device having a housing wherein are suspended a plurality of flexible cloth or fabric filtering elements that are formed as cylindrical bags. Such devices are commonly known as bag houses. After a period of operation, the particles that accumulate on the filtering elements must be removed. That is typically done by shaking or vibrating the elements to dislodge the particles, which then fall into hoppers or other recepticles disposed at the bottom of the housing.

A problem with bag-type filters is to effectively clean the elements without undue wear. Typical practice today is to impart a gentle shaking or oscillatory motion to the bag-support structure and, at the same time, to direct a reverse current of air through the elements to loosen the dust accumulations. In applications such as filtering the fumes discharged by cupolas in steel foundries, a gentle shaking action is not sufficient to dislodge the dust that agglomerates on the filtering elements, and more vigorous shaking has been found to be deleterious to the filtering elements, especially those formed of synthetic fabrics such as fiber glass. The vigorous back-and-forth bending eventually snaps the synthetic strands. Workers in the art, however, have found that bags made of synthetic fibers have superior filtering characteristics when used in high-temperature or moist atmospheres or when cleaning certain acidic gases and, accordingly, have sought effective means for cleaning such filtering bags.

OBJECTS OF THE INVENTION

The primary object of the present invention is to provide improved means for dislodging accumulated particles from the filtering elements in bag-type filtration devices. A more specific object is to provide such means which will clean filtering elements constructed of synthetic fabric without unduly damaging the fabric.

BRIEF DESCRIPTION OF THE DRAWINGS

The present invention can be readily understood by referring to the following description and appended drawing, which are offered by way of illustration only and not in limitation of the invention, the scope of which is defined by the appended claims and equivalents to the structure, acts and materials specified hereinafter. In the drawings.

DETAILED DESCRIPTION OF THE PREFERRED EMBODIMENT

Figure 1:
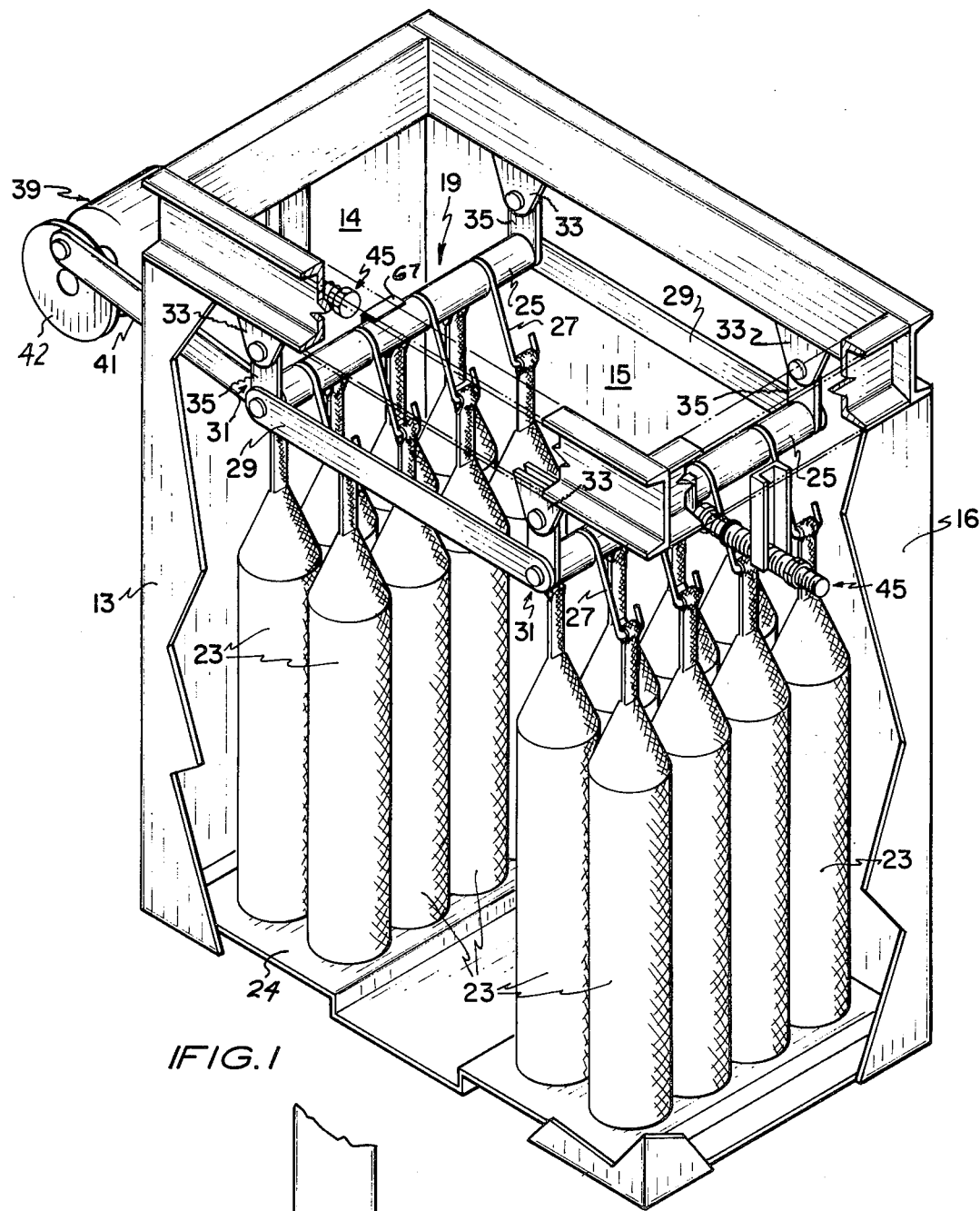
FIG. 1 is a pictorial view of the upper section of a bag-type filter device inclusive of a device according to the present invention.

The filtering unit shown in FIG. 1 includes a rectangularly-shaped housing having four generally upstanding non-foraminous sidewalls 13–16 that define a cleaning compartment. A movable frame means, generally designated 19, mounted at the top of the compartment supports a plurality of vertically-disposed bag-type filtering elements 23 in spaced-apart relationship. The filtering elements 23 are conventional; they are formed as elongated tubes, have closed tops, are porous and may be made from either cloth or a synthetic fabric. The filtering elements are suspended in tension and their lower ends are stationarily mounted in a manifold plate 24 so that gas to be cleaned is admitted into the interior of the elements. Typically, the gas flow is induced by fans or blowers. With such an arrangement, dust and other particulate matter accumulates on the inside walls of the bags and cleaned gases pass into the space between the bags and thence to discharge upward through the roof of the cleaning compartment.

The bag-support frame means 19 is a generally rigid structure. In the illustrated embodiment, the frame includes a plurality of horizonally-disposed beams 25 that extend transversely across the cleaning compartment parallel and in spaced-apart relationship to one another. The filtering bags 23 are individually suspended in tension from the support beams 25, say by conventional hanger members 27. The respective ends of the support beams 25 are pivotally connected to a pair of parallel rigid "driven" beams 29 which, in turn, are supported by depending pivot mechanisms, generally designated 31, connected to the housing's structural frame to allow the driven beams to move in an oscillatory or swaying manner.

Each of the illustrated pivot mechanisms 31 includes an upper support bracket 33 stationarily fixed to the housing's structural frame and a short link 35 pivotally connecting the bracket to the associated driven beam 29. The pviot mechanisms are located along the sides of the cleaning compartment so as to fully support the driven beams 29 and, hence, the bag-support frame means so that it can sway or oscillate back and forth in a generally horizontal direction.

Such oscillatory motion is imparted to the bag-support frame 19 by a drive unit 39 that is connected to at least one of the aforementioned driven beams 29. The particularly illustrated drive unit is a stationarily-mounted rotary motor that is pivotally coupled to one of the driven beams 29 by a working shaft 41 and an eccentric 42 so that rotational motion of the eccentric imparts reciprocative or oscillatory movement to the driven beam and, hence, to the filtering bags 23. It should be understood that other drive arrangements can be utilized to impart a generally positive back-and-forth movement to the filtering bags; for example, a reciprocative piston mechanism could be used. Also, various types of frame-supporting pivot mechanisms can be employed in place of those particularly illustrated. Furthermore, the bags themselves can be supported for oscillatory movement by structures other than the illustrated bag-support frame means.

In practice the frequency and amplitude of the oscillations of the bag-support frame are adjustable by means of changing the drive unit speed or adjusting the connecting linkage. Typically, the frequency ranges from 150 to 300 cycles per minute and the amplitude varies from ¼ to 1¼ inch either side of the center.

According to the present invention, impacting mechanisms 45 are provided to cause an impact against the bag-support frame 19 at the extremes of its oscillatory motion; the impacts superimpose shock waves on the gentle swaying motion of the filtering bags and thereby dislodge dust from the walls of the bags. The impacting mechanisms can either be mounted on the housing's structural frame as shown or can be carried by the bag-support frame means 19; in the former case, the impacting devices will strike the moving frame means and in the latter case would strike the stationary housing frame. Also, the impacting devices can be horizontally disposed as shown or arranged at a slight angle from horizontal. Typically, a single impacting device is located at each end of the travel of the bag-support frame.

Figure 2:
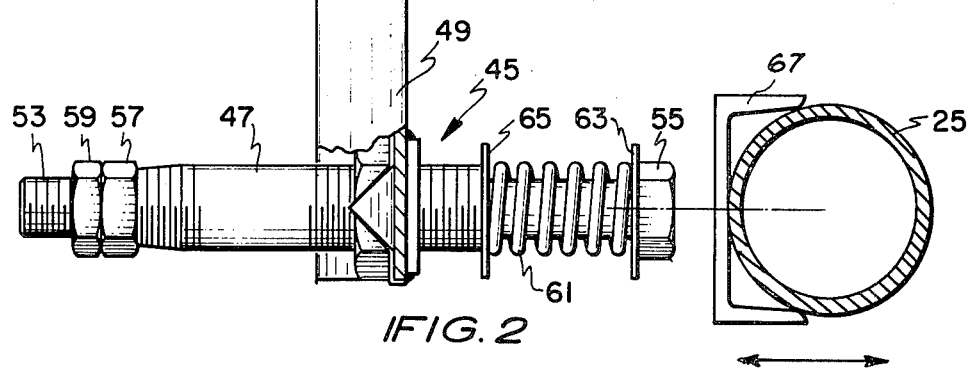
FIG. 2 is an elevational view, enlarged for purposes of clarity, of the device of the present invention.

As shown in FIG. 2, a single one of the impacting mechanisms 45 includes an externally-threaded tubular member or sleeve 47 which is screwed into a receiving bracket 49 that is stationarily fixed on the structural frame of the cleaning compartment. The shank of a bolt-like striker member 53 is slidably disposed within the sleeve 47 and projects substantially from both ends thereof. The striker member 53 is retained in association with the sleeve by its head 55 and by a securing nut 57 threaded onto the end of the shank. A jam nut 59 can be provided to prevent the securing nut 57 from working loose during the operation of the impacting device. A coiled compression spring 61 encircles the shank and, in the illustrated embodiment, is retained between the head 55 and the adjacent end of the sleeve 47 by opposed flat washers 63 and 65.

Normally, the impacting mechanism 45 is adjusted so that the spring 61 is placed in compression even when the mechanism is not operating upon the bag-support frame. The amount of precompression on the spring 61 is determined by the distance the nut 57 is drawn onto the shank; the further the nut is taken up, the greater the compressive force on the spring. Typically, the spring compression is about 36 pounds per inches.

In operation, the impacting mechanisms are mounted so that the heads 55 strike or butt the bag-support frame just prior to the frame reaching the extremes of its displacement. Normally, the support frame would undergo a gradual de-acceleration at the ends of its travel but, when the impacting devices are utilized, there is a sharp shock or impact felt by the frame at the ends of the stroke. The shock is accentuated because the frame is not perfectly rigid and because there is a certain amount of play in the support mechanisms and in the drive linkage. Vibrations from the shock received by the frame are transmitted to the filtering bags and have been found surprisingly effective in practice to dislodge accumulated particles from the interior walls of the bags 23. The discharged dust falls downwardly for collection in hoppers or the like, not shown, arranged below the manifold plate 24. When the imparting device strikes the frame, the shank 53 is driven to slide back through the sleeve 47 until such a point that the frame reaches the end of its stroke; the reactive force exerted by the impacting device is proportional to the spring displacement and the magnitude of the impact depends in part on the spring stiffness.

The impacting mechanism has several adjustments. As already mentioned, the precompression of the spring 61 is adjustable by taking up the nut 57. That adjustment determines the magnitude of the reactive force exerted by the spring against the bag-support frame since spring force is directly or linearly proportional to displacement according to Hooke's law. Secondly, the stop clearance or shock impact-point is selectively determined by screwing the externally-threaded sleeve 47 into or out of the bracket 49. This adjustment also determines the total displacement of the spring 61 during a working cycle. A typical displacement varies from about three-eighths inch to one-half inch. The shock impact point can also be varied by adjusting precompression on the spring, although that is usually preset. These various adjustments of the impacting device allows flexibility in tuning the resultant shock wave for any fabric or dust loading combination, thus making it possible to optimize the cleaning of the filtering elements under differing conditions.

As shown both in FIGS. 1 and 2, bumper members or guards 67 can be fixedly carried by the frame means 19 and positioned to hit the striking ends 55 of the impacting devices 45. The bumpers 67 prevent damage to the beams 25.

We claim:

1. In a filtration apparatus for removing suspended particulates from gases, which apparatus has flexible bag-shaped filtering elements suspended in tension in a cleaning compartment from a rigid frame that is constructed and arranged to be driven in an oscillatory manner to shake the bag-shaped filtering elements, means for driving the rigid frame in an oscillatory manner, and an impacting device for imparting mechanical impacts against said frame as the same undergoes the oscillatory motion, said impacting device comprising:
   a. a bracket that is mounted stationarily in the cleaning compartment;
   b. a rigid striker member and cooperatively-associated adjustable means adjustably mounting and positioning said striker member in said bracket to extend to a location whereat an end of the striker member is impacted by the frame on the frame's oscillatory path of travel; and
   c. resilient and adjustable biasing means cooperatively associated with said striker member and said adjustable mounting means for resiliently biasing the striker member relative the mounting means so that said striker member moves resiliently following an impact with the frame.

2. An impacting device according to claim 1 wherein said adjustable mounting means comprises an adjustably positionable a sleeve and said striker member is slidably disposed therein with said end of said striker member projecting substantially from said sleeve.

3. An impacting device according to claim 2 wherein said sleeve is externally threaded and is adjustably positioned in a threaded receiving aperture formed in said bracket.

4. An impacting device according to claim 2 wherein said striker member is a bolt-like member with a head and a shank, and said shank is slidably disposed within said sleeve.

5. An impacting device according to claim 4 wherein said biasing means comprises a coil spring that encircles said shank and adjustment means are provided to place said spring adjustably in compression between said head and said bracket.

6. An impacting device according to claim 4 wherein said biasing means comprise a coil spring that encircles said shank between said head and the adjacent end of said sleeve.

7. An impacting device according to claim 6 further including adjustment means selectively draw said shank through said sleeve to adjust the precompression on said spring.

8. An impacting device according to claim 6 wherein said shank has a free end opposite said head and said free end is threaded and a nut is received thereon to selectively draw the shank through said sleeve to adjust the precompression on said spring.

9. A filtration apparatus according to claim 1 wherein said bag-shaped filtering elements are formed from fiber glass.

10. In a filtration apparatus for removing suspended particulates from gases, which apparatus includes flexible bag-shaped filtering elements suspended in tension in a cleaning compartment from a rigid frame that is constructed and arranged to be driven in an oscillatory manner to shake the bag-shaped filtering elements, means for driving the rigid frame in an oscillatory manner, and an impacting device for imparting mechanical impacts against said frame as the same undergoes the oscillatory motion, said impacting device comprising:
   a. a bracket mounted stationarily in the cleaning compartment;
   b. an externally-threaded sleeve that is adjustably received by said bracket;
   c. a rigid striker member having a shank that is slidably received in said sleeve and a striking head at one end of said shank positioned to be impacted by the frame during the frame's oscillatory path of travel;
   d. a coil spring that encircles said shank between said striking head and the adjacent end of said sleeve; and
   e. means adjustably securing the opposite end of said shank against said sleeve for adjusting the compression on said spring.

11. In a filtration apparatus for removing suspended particulates from gases, which apparatus is of the type having flexible bag-shaped filtering elements suspended in tension in a cleaning compartment from rigid frame means that is constructed and arranged to be driven in an oscillatory manner to shake the bags, means for driving the rigid frame means in an oscillatory manner, and an impacting device for imparting mechanical impacts against said frame means as the same undergoes the oscillatory motion, said impacting device comprising:
   a. a bracket fixedly mounted in the cleaning compartment;
   b. a rigid striker member having a striking end and having a shank portion that is slidably received in said bracket;
   c. a coil spring that encircles said shank to bias said striking end outwardly from said bracket; and
   d. adjustable means securing the end of said shank opposite said striking end against said bracket for adjusting the compression on said spring.

12. A device according to claim 10 further including a bumper member fixedly carried by said frame means in a position to be struck by said striking end of said striker member.

13. A filtration apparatus for removing suspended particulates from gases comprising:
   a. a stationary filtering compartment;
   b. a rigid frame horizontally disposed within the upper region of the filtering compartment and supported to be driven generally horizontally in an oscillatory manner;
   c. a means to drive the rigid frame in an oscillatory manner;
   d. a plurality of flexible bag-shaped filtering elements suspended in tension in said cleaning compartment from said frame to be shaken thereby; and
   e. an impacting device for imparting mechanical impacts against the frame at an extreme of its oscillatory motion, said impacting device comprising:
      i. a bracket that is stationarily mounted in said cleaning compartment;
      ii. a sleeve member adjustably mounted in said bracket;
      iii. a rigid striker member having a shank portion and a striker head, said shank portion being slidably received in said sleeve member;
      iv. adjustable retainer means fixed to the end of said shank portion opposite said striker head to stop said end of said shank portion from moving through said sleeve member; and
      v. resilient biasing means cooperatively associated with said striker member and said sleeve member to position the striker head at a position whereat the striker head is impacted by the frame along the oscillatory path of travel of the frame.

14. An apparatus according to claim 13 wherein said biasing means comprises a coil spring that encircles said shank portion and adjustment means are provided to place said spring adjustably in compression between said striker head and said bracket.

15. An apparatus according to claim 13 wherein said biasing means comprise a coil spring that encircles said shank portion between said head and the adjacent end of said sleeve.

16. Apparatus according to claim 15 said adjustable retainer means selectively draw said shank through said sleeve to adjust the precompression on said spring.

17. An impacting device according to claim 13 wherein said end of said shank portion opposite said strike head is threaded and said retainer means comprises a nut received on said opposite end portion to selectively draw the shank portion through said sleeve to adjust the precompression on said spring.

18. In a filtration apparatus for removing suspended particulates from gases, which apparatus has flexible bag-shaped filtering elements suspended in tension in a cleaning compartment from a rigid frame that is constructed and arranged to be driven in an oscillatory manner to shake the bag-shaped filtering elements, means for driving the rigid frame in an oscillatory manner, and an impacting device for imparting mechanical impacts against said frame as the same undergoes the oscillatory motion, said impacting device comprising:
   a. a bracket that is stationarily mounted in said cleaning compartment;
   b. a sleeve member which is adjustably received in said bracket;
   c. a rigid striker member having a shank portion and an enlarged striker head which is positioned to be impacted by the frame during the frame's oscillatory path of travel, said shank portion being slidably received in said sleeve member;
   d. adjustable retainer means fixed to said shank portion at the end opposite from said striker head to retain said striker member for back-and-forth sliding motion within said sleeve member; and
   e. a coiled compression spring arranged to encircle said shank portion and to provide a biasing force between the striker head member and the proximate end of said sleeve member, the compression of said spring being determined by adjustment of said retainer means and the position of said striker head relative to said bracket being determined by adjustment of the position of said sleeve member in said bracket.

19. The invention according to claim 18 wherein said sleeve member is externally threaded and is adjustably positioned in a threaded receiving aperture formed in said bracket.

20. The filtration apparatus of claim 18 wherein said filtering elements are formed from fiber glass.

21. In a filtration apparatus for removing suspended particulates from gases, which apparatus has bag-shaped filtering elements formed from flexible fiber glass and suspended in tension in a cleaning compartment from a rigid frame that is constructed and arranged to be driven in an oscillatory manner to shake the bag-shaped filtering elements, means for driving the rigid frame in an oscillatory manner, and an impacting device for imparting mechanical impacts against said frame as the same undergoes the oscillatory motion, said impacting device comprising:

a. a bracket that is fixedly mounted on said frame;

b. a rigid striker member and cooperatively-associated adjustable means adjustably mounting and positioning said striker member in said bracket to extend to a location whereat an end of the striker member impacts against the cleaning compartment on the frame's oscillatory path of travel; and c. resilient and adjustable biasing means cooperatively associated with said striker member and said adjustable mounting means for resiliently biasing the striker member relative the mounting means so that said striker member moves resiliently following an impact with the cleaning compartment.

* * * * *

UNITED STATES PATENT AND TRADEMARK OFFICE
CERTIFICATE OF CORRECTION

PATENT NO. : 3,955,947

DATED : MAY 11, 1976

INVENTOR(S) : HARRY E. HOON and MARIAN C. POGODA

It is certified that error appears in the above-identified patent and that said Letters Patent are hereby corrected as shown below:

At Column 2, line 37, please delete "pviot" and insert therefor -- pivot --.

At Column 3, line 55, delete "parting" and insert therefor -- pacting --.

At Column 4, line 45, delete "a".

At Column 6, line 37, delete "strike" and insert therefor -- striker --.

Signed and Sealed this

Tenth Day of July 1979

[SEAL]

Attest:

LUTRELLE F. PARKER

*Attesting Officer*     *Acting Commissioner of Patents and Trademarks*